United States Patent
Chen

(10) Patent No.: US 6,487,240 B1
(45) Date of Patent: Nov. 26, 2002

(54) APPARATUS FOR RECEIVING AND RECOVERING FREQUENCY SHIFT KEYED SYMBOLS

(75) Inventor: Weizhong Chen, Keller, TX (US)

(73) Assignee: Motorola, Inc., Schaumburg, IL (US)

( * ) Notice: Subject to any disclaimer, the term of this patent is extended or adjusted under 35 U.S.C. 154(b) by 98 days.

(21) Appl. No.: 09/709,687

(22) Filed: Nov. 10, 2000

(51) Int. Cl.⁷ .................................................. H04L 5/16
(52) U.S. Cl. ...................... 375/219; 375/269; 375/278; 375/334; 375/348; 375/350; 708/300; 455/43; 455/214; 455/227; 455/296; 329/318
(58) Field of Search ................................. 375/219, 269, 375/272, 278, 303, 334, 340, 346, 348, 350, 296; 708/300, 321; 455/42, 43, 150.1, 161.2, 188.1, 205, 214, 227, 295, 296; 329/300–302, 318

(56) References Cited

U.S. PATENT DOCUMENTS 5,208,835 A * 5/1993 Weeks et al. ................ 329/307
5,852,636 A * 12/1998 Mathieu et al. ............. 332/100
6,266,521 B1 * 7/2001 Hattori et al. ............... 375/340

OTHER PUBLICATIONS

B. Rohani and K.S. Chung; Combined MLSE/Frequency Detection of the GSM Signal; 1998 IEEE; pp. 419–423.
Yasunori Iwanami; Performance of Sequence Estimation Scheme of Narrowband Digital FM Signals with Limiter–Discriminator Detection; 1997 IEEE; pp. 310–315.

* cited by examiner

*Primary Examiner*—Stephen Chin
*Assistant Examiner*—Dac V. Ha
(74) *Attorney, Agent, or Firm*—Matthew C. Loppnow

(57) ABSTRACT

A receiver architecture includes a selectivity filter (206) for selectively passing a wanted channel and rejecting unwanted channels. The selectivity filter has a filter BT of about one-half the BT of the transmitter filter. A discriminator (208) is coupled to the selectivity filter for converting received symbols from the frequency domain to the time domain symbols. A symbol recovery processor (210) is coupled to the discriminator for recovering the symbols through a two-state maximum likelihood sequence estimation (MLSE) technique in which templates are optimized with a BT substantially less than the BT of the transmitter filter.

24 Claims, 2 Drawing Sheets

APPARATUS FOR RECEIVING AND RECOVERING FREQUENCY SHIFT KEYED SYMBOLS

FIELD OF THE INVENTION

This invention relates in general to wireless communication systems, and more specifically to an apparatus for receiving and recovering frequency shift keyed symbols.

BACKGROUND OF THE INVENTION

Digital wireless communication systems have utilized many different types of modulation for transmitting data. One type of modulation which has become popular is Gaussian frequency shift keyed (GFSK) modulation. The well-known Bluetooth wireless communication system, for example, utilizes two-level GFSK modulation.

A GFSK modulator performs filtering on the data symbols to be transmitted in order to limit the transmission bandwidth. This transmitter filter causes a significant amount of inter-symbol interference (ISI), making the symbols harder to detect in a receiver. In order not to exacerbate the ISI, prior-art GFSK receivers have generally utilized relatively wide-band selectivity filters, thereby reducing adjacent channel rejection. Additional elements, such as a post-detection filter (PDF) and a maximum likelihood sequence estimation (MLSE) element having four or sixteen states for a two-level GFSK channel, have been used to compensate for the ISI. The templates of the MLSE are generally used with a bandwidth matching that of the transmitter filter. Such additional elements add to the cost of the receiver and increase the total power consumption.

Thus, what is needed is an apparatus for receiving and recovering symbols transmitted in an FSK digital wireless channel. The apparatus preferably will achieve high sensitivity and adjacent channel rejection without requiring either the PDF or the four- or sixteen-state MLSE element.

DETAILED DESCRIPTION OF THE DRAWINGS

Figure 1:
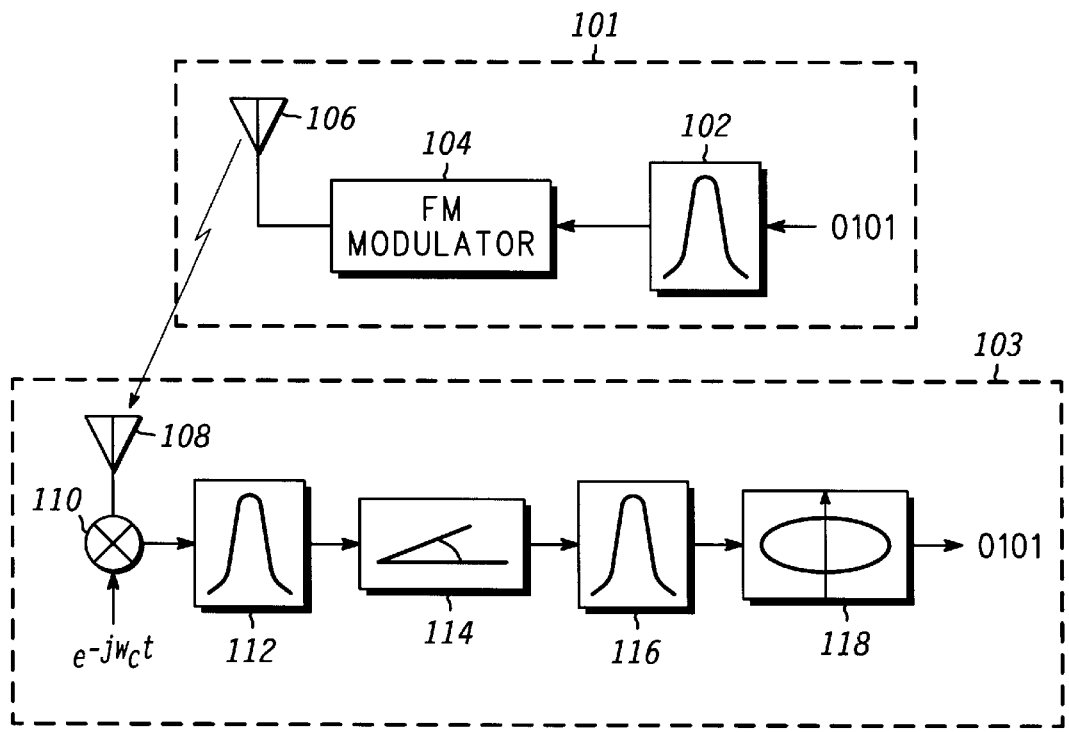
FIG. 1 is an electrical block diagram of a prior-art transceiver.

Referring to FIG. 1, an electrical block diagram of a prior-art transceiver 100 comprises a transmitter 101 and a receiver 103. The transmitter 101 preferably includes a Gaussian transmitter filter 102 having the ratio of the half-bandwidth B to the symbol rate 1/T (BT) of 0.5. The transmitter filter 102 is coupled to an FM modulator 104 for generating a GFSK radio signal. An antenna 106 is coupled to the FM modulator for transmitting the signal.

The receiver 103 includes an antenna 108 for intercepting the GFSK signal from the transmitter 101. The antenna 108 is coupled to a down-converter 110 for down-converting the received signal. The down-converter 110 is coupled to a selectivity filter 112 for selectively tuning a desired channel, rejecting the adjacent channel interference, and reducing the AWGN bandwidth. It has been generally accepted that the bandwidth of the selectivity filter should be not less than the bandwidth of the transmitted GFSK signal, so that the inter-symbol interference (ISI) does not become severe. A discriminator 114 is coupled to the selectivity filter 112 for converting the frequency-domain symbols of the received signal to time-domain symbols. A post detection filter (PDF) 116 is coupled to the discriminator 114 for reducing the noise non-linearly amplified by the discriminator. A slicing element 118 is coupled to the PDF for symbol recovery.

Figure 2:
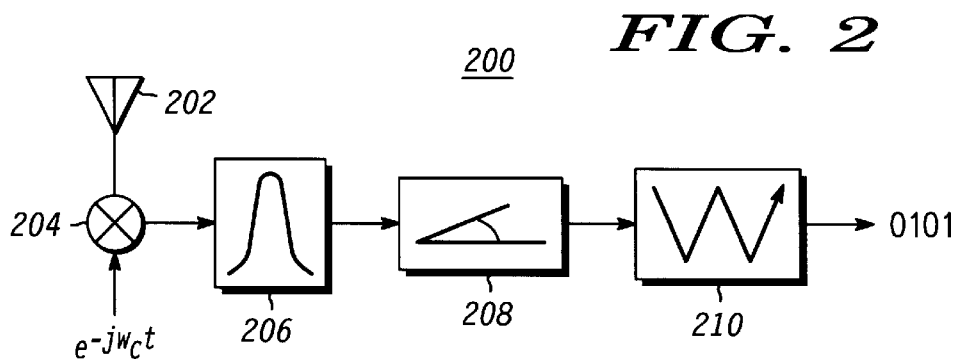
FIG. 2 is an electrical block diagram of a receiver in accordance with the present invention.

Referring to FIG. 2, an electrical block diagram of a receiver 200 in accordance with the present invention comprises a conventional antenna 202 for intercepting the GFSK signal from the transmitter 101. The antenna 202 is coupled to a conventional down-converter 204 for down-converting the received signal. The down-converter 204 is preferably coupled to a fourth-order selectivity filter 206 for selectively tuning the desired channel. To improve the sensitivity and the adjacent channel rejection, the BT of the selectivity filter 206 is preferably about one-half the transmitter filter BT (i.e., selectivity filter BT=0.25). It is understood that this unusually narrow selectivity filter bandwidth will cause severe ISI, which will have to be compensated later in symbol recovery. A conventional discriminator 208 is coupled to the selectivity filter 206 for converting the frequency-domain symbols of the received signal to time-domain symbols.

A symbol recovery processor 210 is coupled to the discriminator 208 for recovering the symbols preferably through a two-state maximum likelihood sequence estimation (MLSE) technique. To compensate for the severe ISI introduced by the unusually narrow selectivity filter, the templates used in the MLSE are optimized with a bandwidth substantially less than the transmitter filter bandwidth. More specifically, to compensate for the ISI caused by both the Gaussian filter 102 of the transmitter 101 and the selectivity filter 206, the templates preferably are optimized with a BT equal to the transmitter filter BT divided by approximately the square root of three. Note that no post detection filter is required in this receiver architecture, because the unusually narrow bandwidth of the selectivity filter alone provides ample adjacent channel rejection and AWGN noise bandwidth reduction. It will be appreciated that, alternatively, the selectivity filter bandwidth and the templates can be adjusted somewhat about the preferred values, depending upon design preference. It will be further appreciated that all or a portion of the receiver 200 can be manufactured in the form of one or more integrated circuits.

In one embodiment, the receiver 200 is designed to operate in a Bluetooth communication system. This embodiment requires the selectivity filter 206, the discriminator 208, and the symbol recovery processor 210 to be arranged and programmed to receive and recover symbols transmitted in a two-level Gaussian frequency shift keyed (2-GFSK) channel having a data rate of 1 Mbps and a transmitter filter BT of 0.5. It will be appreciated that, alternatively, the receiver 200 can be operated in other systems at other data rates with other forms of modulation and other transmission bandwidths.

Figure 3:
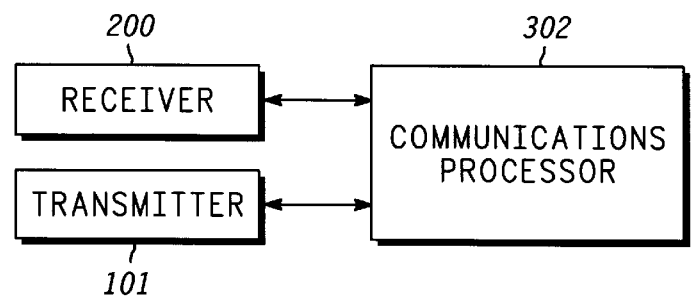
FIG. 3 is an electrical block diagram of a transceiver in accordance with the present invention.

FIG. 3 is an electrical block diagram of a transceiver 300 in accordance with the present invention. The transceiver 300 comprises the receiver 200 and the transmitter 101, both coupled to a communications processor 302 for controlling the receiver 200 and the transmitter 101. In one embodiment, the transceiver 300 is operated in a Bluetooth communication system.

Figure 4:
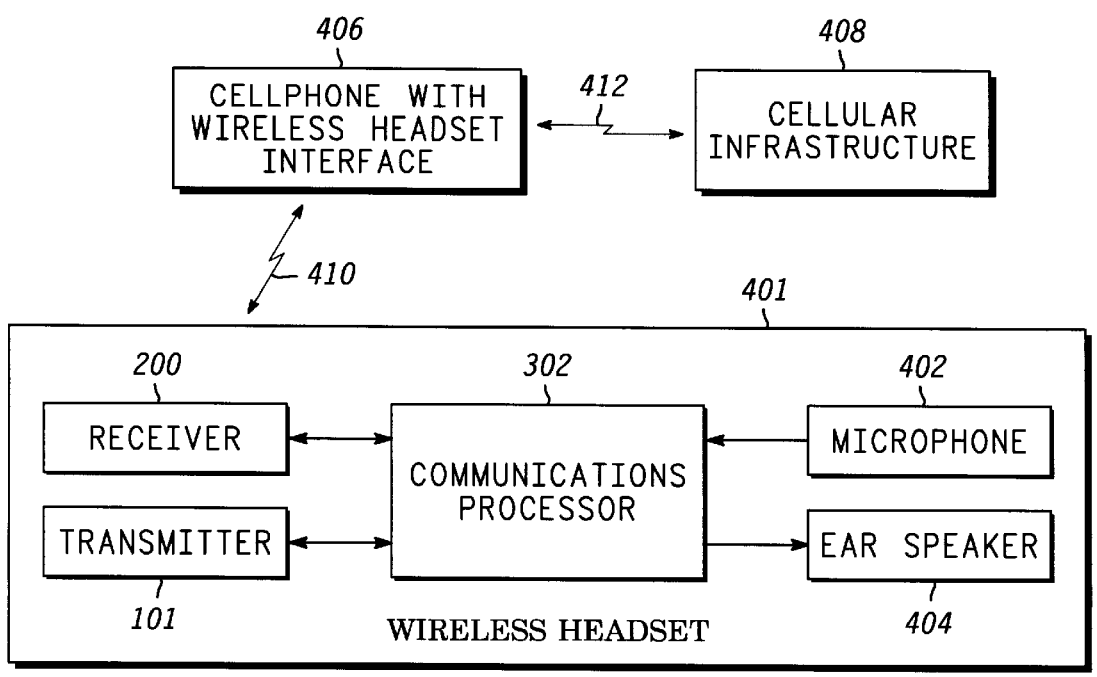
FIG. 4 is an electrical block diagram of a wireless communication system including a wireless headset in accordance with the present invention.

FIG. 4 is an electrical block diagram of a wireless communication system 400 including a wireless headset 401 in accordance with the present invention. The wireless communication system 400 includes a cellphone 406 equipped with a wireless headset interface (not shown), preferably similar to the transceiver 300. The wireless headset 401 includes the transmitter 101 and the receiver 200 coupled to the communications processor 302 for communicating with the cellphone 406 over a first wireless link 410. Also coupled to the communications processor 302 are a first transducer or microphone 402 for receiving a speech input from a user, and a second transducer or ear speaker 404 for conveying to the user a message received over the first wireless link 410. The cellphone 406 also communicates conventionally with the cellular infrastructure 408 over a second wireless link 412. The wireless communication system 400 advantageously allows the user to operate the cellphone 406 in a headset mode without requiring a cord between the cellphone 406 and the wireless headset 401.

What is claimed is:

1. A receiver architecture for receiving and recovering symbols transmitted over a frequency shift keyed (FSK) channel, the symbols transmitted using a transmitter filter having a ratio of transmission bandwidth to symbol rate of BT, where B is the filter half-bandwidth and T is the symbol time, the receiver architecture comprising:
    a selectivity filter for selectively passing the wanted channel and rejecting unwanted channels, the selectivity filter having a filter BT of about one-half the BT of the transmitter filter;
    a discriminator coupled to the selectivity filter for converting the symbols from frequency-domain symbols to time-domain symbols; and
    a symbol recovery processor coupled to the discriminator for recovering the symbols through a two-state maximum likelihood sequence estimation (MLSE) technique in which templates are optimized with a BT substantially less than the BT of the transmitter filter.

2. The receiver architecture of claim 1, wherein the selectivity filter, the discriminator, and the symbol recovery processor are arranged and programmed such that a post-detection filter is not required in the receiver architecture.

3. The receiver architecture of claim 1, wherein the symbol recovery processor is programmed such that the templates are optimized with a BT equal to the BT of the transmitter filter divided by approximately the square root of three.

4. The receiver architecture of claim 1, wherein the selectivity filter, the discriminator, and the symbol recovery processor are arranged and programmed to receive and recover symbols transmitted in a two-level Gaussian frequency shift keyed (2-GFSK) channel having a data rate of 1 Mbps and a transmitter filter BT of 0.5.

5. An integrated circuit for use in a receiver for receiving and recovering symbols transmitted over a frequency shift keyed (FSK) channel, the symbols transmitted using a transmitter filter having a ratio of transmission bandwidth to symbol rate of BT, where B is the filter half-bandwidth and T is the symbol time, the integrated circuit comprising:
    a selectivity filter for selectively passing the wanted channel and rejecting unwanted channels, the selectivity filter having a filter BT of about one-half the BT of the transmitter filter;
    a discriminator coupled to the selectivity filter for converting the symbols from frequency-domain symbols to time-domain symbols; and
    a symbol recovery processor coupled to the discriminator for recovering the symbols through a two-state maximum likelihood sequence estimation (MLSE) technique in which templates are optimized with a BT substantially less than the BT of the transmitter filter.

6. The integrated circuit of claim 5, wherein the selectivity filter, the discriminator, and the symbol recovery processor are arranged and programmed such that a post-detection filter is not required in the integrated circuit.

7. The integrated circuit of claim 5, wherein the symbol recovery processor is programmed such that the templates are optimized with a BT equal to the BT of the transmitter filter divided by approximately the square root of three.

8. The integrated circuit of claim 5, wherein the selectivity filter, the discriminator, and the symbol recovery processor are arranged and programmed to receive and recover symbols transmitted in a two-level Gaussian frequency shift keyed (2-GFSK) channel having a data rate of 1 Mbps and a transmitter filter BT of 0.5.

9. An apparatus for receiving and recovering symbols transmitted over a frequency shift keyed (FSK) channel, the symbols transmitted using a transmitter filter having a ratio of transmission bandwidth to symbol rate of BT, where B is the filter half-bandwidth and T is the symbol time, the apparatus comprising:
    a selectivity filter for selectively passing the wanted channel and rejecting unwanted channels, the selectivity filter having a filter BT of about one-half the BT of the transmitter filter;
    a discriminator coupled to the selectivity filter for converting the symbols from frequency-domain symbols to time-domain symbols; and
    a symbol recovery processor coupled to the discriminator for recovering the symbols through a two-state maximum likelihood sequence estimation (MLSE) technique in which templates are optimized with a BT substantially less than the BT of the transmitter filter.

10. The apparatus of claim 9, wherein the selectivity filter, the discriminator, and the symbol recovery processor are arranged and programmed such that a post-detection filter is not required in the apparatus.

11. The apparatus of claim 9, wherein the symbol recovery processor is programmed such that the templates are optimized with a BT equal to the BT of the transmitter filter divided by approximately the square root of three.

12. The apparatus of claim 9, wherein the selectivity filter, the discriminator, and the symbol recovery processor are arranged and programmed to receive and recover symbols transmitted in a two-level Gaussian frequency shift keyed (2-GFSK) channel having a data rate of 1 Mbps and a transmitter filter BT of 0.5.

13. A receiver for receiving and recovering symbols transmitted over a frequency shift keyed (FSK) channel, the symbols transmitted using a transmitter filter having a ratio of transmission bandwidth to symbol rate of BT, where B is the filter half-bandwidth and T is the symbol time, the receiver comprising:
    a down-converter for down-converting the wireless signal;
    a selectivity filter coupled to the down-converter for selectively passing the wanted channel and rejecting unwanted channels, the selectivity filter having a filter BT of about one-half the BT of the transmitter filter;
    a discriminator coupled to the selectivity filter for converting the symbols from frequency-domain symbols to time-domain symbols; and
    a symbol recovery processor coupled to the discriminator for recovering the symbols through a two-state maximum likelihood sequence estimation (MLSE) technique in which templates are optimized with a BT substantially less than the BT of the transmitter filter.

14. The receiver of claim 13, wherein the selectivity filter, the discriminator, and the symbol recovery processor are arranged and programmed such that a post-detection filter is not required in the receiver.

15. The receiver of claim 13, wherein the symbol recovery processor is programmed such that the templates are optimized with a BT equal to the BT of the transmitter filter divided by approximately the square root of three.

16. The receiver of claim 13, wherein the selectivity filter, the discriminator, and the symbol recovery processor are arranged and programmed to receive and recover symbols transmitted in a two-level Gaussian frequency shift keyed (2-GFSK) channel having a data rate of 1 Mbps and a transmitter filter BT of 0.5.

17. A transceiver for receiving and recovering symbols transmitted over a frequency shift keyed (FSK) channel, the symbols transmitted using a transmitter filter having a ratio of transmission bandwidth to symbol rate of BT, where B is the filter half-bandwidth and T is the symbol time, the transceiver comprising:

a transmitter for transmitting a communication signal;

a communications processor coupled to the transmitter for controlling the transmitter; and a receiver coupled to the communications processor for receiving the wireless signal, the receiver comprising:

a down-converter for down-converting the wireless signal;

a selectivity filter coupled to the down-converter for selectively passing the wanted channel and rejecting unwanted channels, the selectivity filter having a filter BT of about one-half the BT of the transmitter filter;

a discriminator coupled to the selectivity filter for converting the symbols from frequency-domain symbols to time-domain symbols; and a symbol recovery processor coupled to the discriminator for recovering the symbols through a two-state maximum likelihood sequence estimation (MLSE) technique in which templates are optimized with a BT substantially less than the BT of the transmitter filter.

18. The transceiver of claim 17, wherein the selectivity filter, the discriminator, and the symbol recovery processor are arranged and programmed such that a post-detection filter is not required in the transceiver.

19. The transceiver of claim 17, wherein the symbol recovery processor is programmed such that the templates are optimized with a BT equal to the transmitter filter BT divided by approximately the square root of three.

20. The transceiver of claim 17, wherein the selectivity filter, the discriminator, and the symbol recovery processor are arranged and programmed to receive and recover symbols transmitted in a two-level Gaussian frequency shift keyed (2-GFSK) channel having a data rate of 1 Mbps and a transmitter filter BT of 0.5.

21. A wireless headset for a two-way portable communication device, the wireless headset for receiving and recovering symbols transmitted over a frequency shift keyed (FSK) channel, the symbols transmitted using a transmitter filter having a ratio of transmission bandwidth to symbol rate of BT, where B is the filter half-bandwidth and T is the symbol time, the wireless headset comprising:

a first transducer for receiving a speech input from a user;

a transmitter coupled to the first transducer for transmitting to the two-way portable communication device a communication signal comprising the speech input;

a communications processor coupled to the transmitter for controlling the transmitter;

a receiver coupled to the communications processor for receiving the wireless signal from the two-way portable communication device; and a second transducer coupled to the receiver for conveying to the user a message received in the digital wireless signal, and wherein the receiver comprises:

a down-converter for down-converting the wireless signal;

a selectivity filter coupled to the down-converter for selectively passing the wanted channel and rejecting unwanted channels, the selectivity filter having a filter BT of about one-half the BT of the transmitter filter;

a discriminator coupled to the selectivity filter for converting the symbols from frequency-domain symbols to time-domain symbols; and a symbol recovery processor coupled to the discriminator for recovering the symbols through a two-state maximum likelihood sequence estimation (MLSE) technique in which templates are optimized with a BT substantially less than the BT of the transmitter filter.

22. The wireless headset of claim 21, wherein the selectivity filter, the discriminator, and the symbol recovery processor are arranged and programmed such that a post-detection filter is not required in the wireless headset.

23. The wireless headset of claim 21, wherein the symbol recovery processor is programmed such that the templates are optimized with a BT equal to the BT of the transmitter filter divided by approximately the square root of three.

24. The wireless headset of claim 21, wherein the selectivity filter, the discriminator, and the symbol recovery processor are arranged and programmed to receive and recover symbols transmitted in a two-level Gaussian frequency shift keyed (2-GFSK) channel having a data rate of 1 Mbps and a transmitter filter BT of 0.5.

* * * * *